June 17, 1930.                C. B. SAWYER                1,764,087
                          THERMOSTAT CARTRIDGE
                  Filed Aug. 29, 1927        2 Sheets-Sheet 1
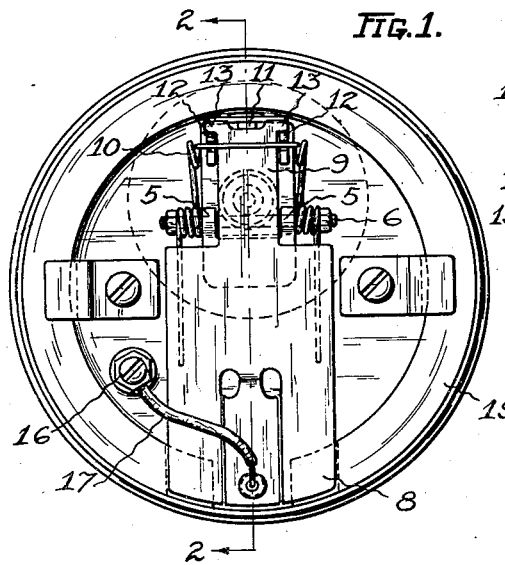
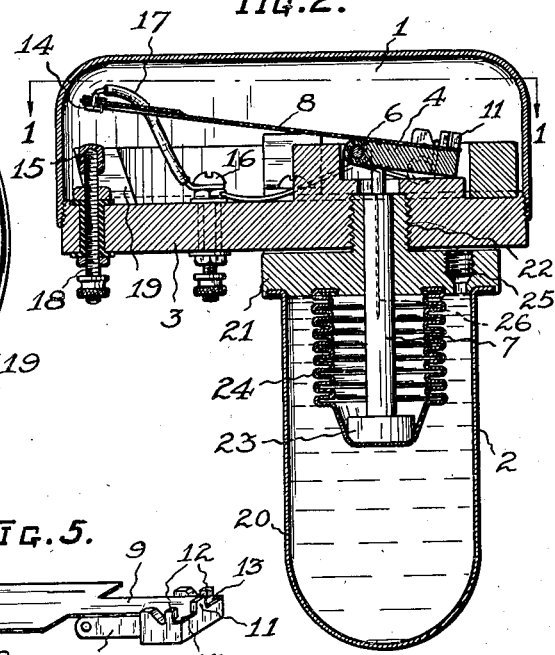
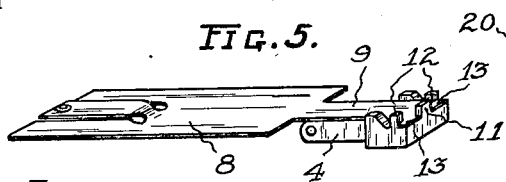
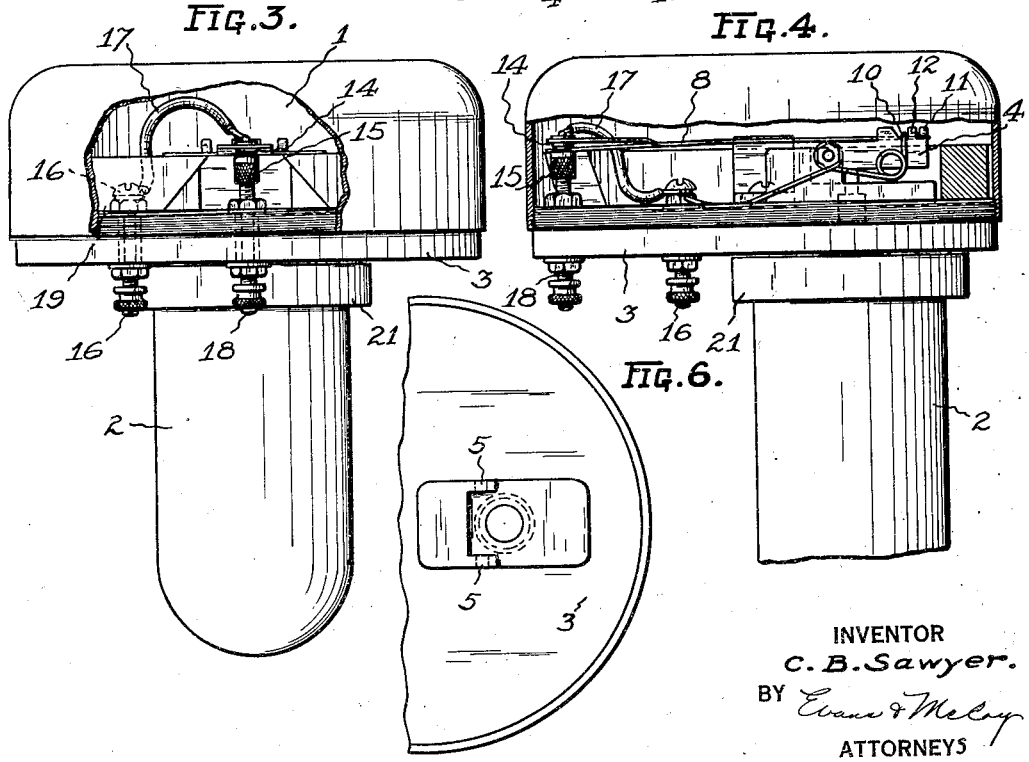
INVENTOR
C. B. Sawyer.
BY Evans & McCoy
ATTORNEYS June 17, 1930.  C. B. SAWYER  1,764,087
THERMOSTAT CARTRIDGE
Filed Aug. 29, 1927   2 Sheets-Sheet 2

INVENTOR
C. B. Sawyer
By Evans & McCoy
ATTORNEYS

Patented June 17, 1930

1,764,087

UNITED STATES PATENT OFFICE

CHARLES B. SAWYER, OF CLEVELAND HEIGHTS, OHIO, ASSIGNOR TO THE BRUSH LABORATORIES COMPANY, OF CLEVELAND, OHIO, A CORPORATION OF OHIO

THERMOSTAT CARTRIDGE

Application filed August 29, 1927. Serial No. 216,093.

This invention relates to precision thermostats and particularly to thermostat cartridges and to a method of manufacturing the same, this application being a continuation in part of my copending application Serial No. 699,707 that was filed March 17, 1924, now Patent No. 1,661,349.

One object of the present invention is the provision of an improved thermostat cartridge that is made up and permanently sealed separate and apart from the switch mechanism with which it is adapted to be used.

Another object of the invention is to provide a thermostat cartridge that is bodily adjustable relative to the support for the mechanism controlled thereby.

A further object of the invention is to provide a thermostat cartridge that is essentially responsive to the thermal expansion of a liquid and substantially independent in its operation of variations in the forces opposing movement of the thermostat actuator.

An additional object of the invention is the provision of a method of manufacturing liquid filled thermostat cartridges that insures great accuracy in the operation thereof.

Other objects of the invention will be apparent from a consideration of the description of preferred embodiments of the invention and the accompanying drawings wherein:

Figure 1 is a plan view, with cover removed, of suitable switch mechanism adapted to be controlled from a thermostat cartridge made in accordance with this invention.

Figure 2 is a section taken on line 2—2 of Figure 1.

Figure 3 is a front elevational view of the switch mechanism and the thermostat cartridge showing a portion of the casing broken away to show the poles of an actuating magnet and the contact members of the switch mechanism.

Figure 4 is a side elevational view of the switch mechanism and the control thermostat cartridge with a portion of the casing broken away to show the control mechanism.

Figure 5 is a perspective view of the switch armature and its associated mounting.

Figure 6 is a top plan view of the supporting base showing the armature mountings.

Figure 9:
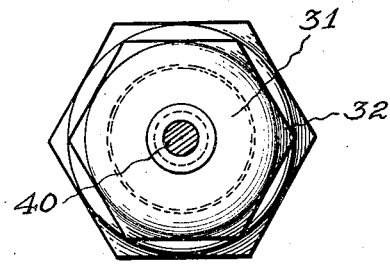
Figure 9 is a top plan view of the thermostat cartridge shown in Figures 7 and 8.

The thermostat shown in the accompanying drawings comprises in general a suitable switch mechanism 1 that is described in detail in my aforesaid copending application and an improved thermostat cartridge 2 that is adjustably mounted in the base 3 of the switch mechanism that actuates the switch mechanism at certain predetermined adjustable temperatures determined by the position of the cartridge relative to the base.

In so far as the present invention is concerned, the switch mechanism may be of any suitable character provided that it is adapted to be actuated by a thermostat cartridge having a very small range of positive movement substantially independent of opposing operating forces and this mechanism will therefore be described only in general.

The switch mechanism comprises an armature supporting lever 4 that is pivotally mounted at one end to ears 5 formed on the base by a horizontal pintle 6. The under face of the lever adjacent the pivot bears upon the reduced upper end portion of the plunger 7 of the thermostat cartridge and the lever supports a combined armature and contact carrying member 8 that is in the form of a flat plate of resilient sheet metal. The end of the armature plate 8 which overlies the upper face of the supporting lever 4 is cut away to provide a central tongue 9 that is held in close engagement with the upper face of the lever by a suitable steel spring 10. The lever 4 is provided at the end remote from its pivot with an upwardly extending lug 11 that assists in defining the position of the armature plate and with upwardly projecting lugs 12 on opposite sides of the tongue 9. The tongue 9 of the armature plate which fits closely between the lugs 12 has its outer end suitably notched to receive the positioning lug 11 of the supporting lever and is provided with laterally projecting lugs 13, which engage with the lugs 12, the projections of the lever and armature plate serving to hold the armature plate against longitudinal and lateral displacement relative to the supporting lever but permitting movement toward and away from the face of the lever upon abnormal expansion of the thermostat cartridge as explained more in detail in the aforesaid application.

The free end of the armature plate carries a contact member 14 that co-operates with a suitable stationary contact member 15 that is carried by the base. The contact member 14 of the armature is connected to a suitable terminal post 16 through a flexible conductor 17 and the stationary contact member 15, is also connected to a suitable terminal post 18, the two posts being insulated from each other.

A suitable permanent magnet 19 is secured to the base in such position as to effectively co-operate with the ends of the armature 8 to provide critical movement of the armature in establishing and interrupting the electical circuit controlled thereby.

The thermostat cartridge to which the present invention relates comprises an external casing 20 that is connected at its open end to a suitable closure member 21 that has a threaded neck 22 which screws into a threaded opening in the base 3 and is the sole means by which the cartridge is supported from the base of the contact mechanism. The neck 22 of the cartridge has an aperture therethrough that is adapted to snugly receive and guide the actuating plunger 7 of the instrument. The lower end of the actuator 7 preferably has an enlarged base 23 that seats in one end of a suitable sylphon 24 that has its other end connected to and closed by the supporting member 21. The chamber defined by the sylphon 24, the casing 20, and the supporting member 21 is completely filled with a liquid, the liquid preferably being an oil or other liquid having a high coefficient of thermal expansion and a boiling point that is relatively high with respect to the range of operating temperatures at which the thermostat cartridge is adapted to operate.

A suitable method of filling a thermostat of this character is to fill the thermostat unit with a liquid previously heated to reduce the concentration of the gases in solution to a point below saturation. The entire unit is then placed within the liquid until all of the entrapped vapors that might be released from the cartridge in service are removed. The sealing plug 25 is then inserted in the filling opening and the chamber which is otherwise fluid tight is completely sealed and the absorption of gases and other vapors by the liquid of the cartridge is precluded. Treatment of liquid to remove gases may or may not be essential depending upon the character of liquid used and the operating conditions to which the cartridge is to be exposed. It is essential, however, to fill the cartridge with a liquid in which the concentration of the gases in solution is well below saturation within the operating temperature range.

This provides a thermostat cartridge in which the actuation of the plunger 7 will be dependent upon the thermal expansion of the liquid contained within the casing of the cartridge, and will be substantially independent of the forces of the switch mechanism opposing movement of the plunger of the cartridge. The plunger of the cartridge closely fits within the aperture of the neck portion 22 of the cartridge member 2 in order that there will be negligible variation in the position of the plunger with respect to the threaded neck portion of the attaching member. A groove 26 of very small dimension is formed in the internal side wall of the apertured neck portion in order to subject the interior of the sylphon to atmospheric pressure that serves to return the sylphon to its expanded position upon the contraction of the thermostatic liquid.

The range of movement of the thermostat cartridge may be increased by forming the casing 20 of a metal having a very low coefficient of temperature expansion such for instance as invar steel, tungsten steel, or other metals of similar temperature characteristics.

In the operation of the instrument, the outward movement of the plunger caused by the thermal expansion of the liquid contained within the cartridge swings the armature supporting lever about its pivot and brings the contact members 14 and 15 into operative relation. In like manner, the contraction of the thermostat liquid withdraws the actuating plunger and effects the separation of the contact members. By turning the thermostat cartridge in the base 3 of the switch mechanism, the operating temperature of the thermostat is adjustably controlled by the bodily movement of the thermostat cartridge relative to the supporting base for the switch mechanism. This provides a simplified control that may be made extremely sensitive by using threads of very fine pitch on the threaded neck portion of the cartridge.

Figure 7:
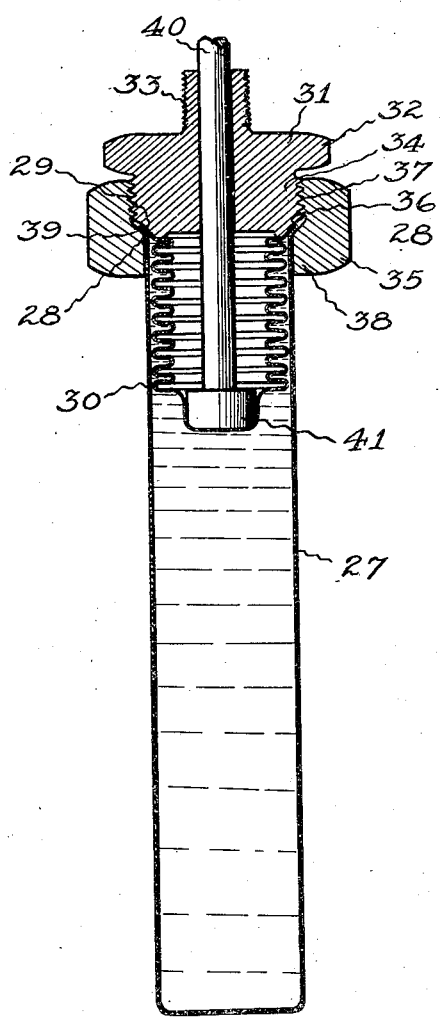
Figure 7 is a longitudinal, sectional view of a thermostat cartridge for use in connection with the switch mechanism shown in the preceding figures.
Figure 8:
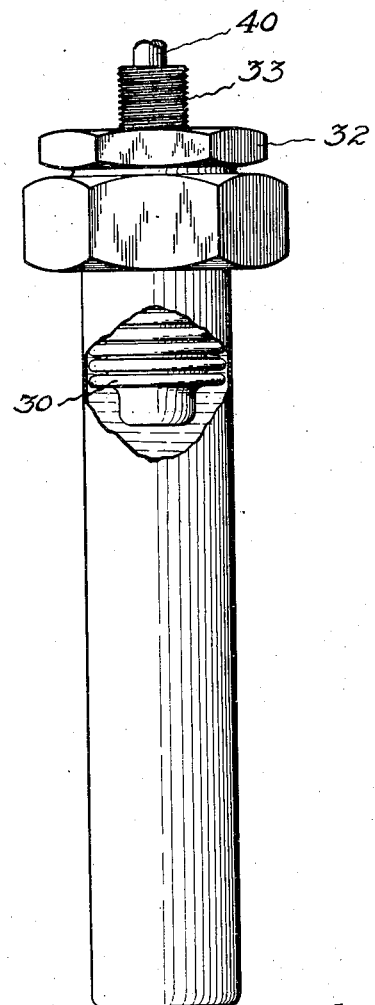
Figure 8 is a side elevational view with a portion of the cartridge casing broken away to show the internal sylphon of the cartridge.

The modified form of thermostat cartridge shown in Fig. 7, Fig. 8 and Fig. 9 of the drawings comprises a casing 27 that is closed at one end and that has an outwardly flared flange portion 28 at its open end, which forms a seat for an outwardly flaring flange 29 at the open end of a sylphon 30 within the cartridge, the flanges 28 and 29 when held in intimate contact serving to seal the chamber formed between the casing and the sylphon.

The cartridge, as in the modification first described, has a supporting and closure forming member 31 which forms the sole means for supporting the cartridge from the base of the switch. The supporting member 31 is in the form of a threaded plug having an enlarged polygonal portion 32 adapted to be engaged by a wrench. Projecting from one side of the enlarged portion 32, there is an externally threaded neck 33 adapted to be screwed into the base of the switch and on the opposite side of the enlarged portion 32, there projects an externally threaded portion 34 which is adapted to receive an internally threaded clamping nut 35. The diameter of the threaded projecting portion 34 of the plug is somewhat greater than the diameter of the cartridge and the end of the projecting portion has a conical seat 36 which fits within the flange 29 of the sylphon. The nut 35 is preferably of polygonal form to receive a wrench or other tool for turning the same and has an axial opening, one end portion 37 of which is internally threaded to screw onto the threaded projection 32 of the plug, the opposite end portion 38 of which is unthreaded and of reduced diameter to snugly fit the exterior of the cylindrical casing 27. The nut 35 is provided with a conical seat 39 between the interior threaded and reduced portions 37 and 38 thereof and this seat fits upon the outer face of the flaring flange 28 of the casing 27 so that when the nut 35 is tightened upon the supporting plug, the flanges 28 and 29 are tightly clamped between the seats 36 and 39 completely sealing the chamber formed by the casing 27 and sylphon 30. The supporting plug 31 has an axial bore through which extends a switch actuating plunger 40, which has an enlarged head 41 secured in the closed inner end of the sylphon and a fine groove may be provided in the wall of the plunger bore to admit air at atmospheric pressure to the interior of the sylphon. In this form of thermostat cartridge the casing 27 is preferably formed of steel or other metal having a very low coefficient of temperature expansion in order that a minimum of liquid may be used in the cartridge to obtain a desired range of movement of the actuating plunger.

This cartridge is preferably manufactured in a manner similar to the previously described cartridge. The thermostat liquid, a suitable oil such as a mineral oil, benzine, carbon tetrachloride or other liquids, that are suitable to be used as a thermostat liquid, are preferably first heated to such temperature as to remove therefrom vapors that might be released from the liquid when the cartridge is subjected to operating temperatures. The various parts of the thermostat unit are then submerged in the liquid in such manner as to prevent the formation of bubbles. The thermostat cartridge is assembled while submerged in the heated liquid. This precludes the introduction into the interior of the cartridge of air or gas pockets.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In mechanism of the character described, the combination with a supporting base and control mechanism carried by said base of a thermostat cartridge for operating said control mechanism adjustably carried by said base and adapted to be bodily moved relative thereto for adjusting the operation of said control mechanism, said cartridge comprising a relatively inextensible cup-shaped member, a relatively extensible cup-shaped member disposed entirely within said inextensible cup-shaped member, an apertured closure member engaging the edge portions of the open end of each of said members to define a liquid-tight chamber between said members for receiving a thermostatic liquid, said apertured member being provided with an externally threaded neck portion, and an actuating plunger extending through the apertured neck portion of said member to the end of said extensible cup-shaped member, said cartridge being adjustably secured to said base by means of said neck portion, said actuating plunger being adapted to substantially fill the aperture in said member and to be accurately positioned thereby.

2. In mechanism of the character described, the combination with a supporting base having a threaded aperture and control mechanism carried by said base, of a thermostat cartridge carried by said base comprising a cup-shaped relatively inextensible casing, an extensible cup-shaped bellows cooperating with said cup-shaped member, means for sealing the open ends of the casing and bellows for forming a fluid tight chamber within the casing and exteriorly of the bellows, a thermostatic liquid completely filling said chamber, said sealing means including a closure member having a threaded portion adapted to be screwed into the aperture of the base, said closure member having an aperture extending therethrough, and a plunger for operating said control mechanism and making a close sliding fit in said aperture and connected to the inner end of said cup-shaped bellows, said cartridge and plunger being bodily adjustable relative to said control mechanism by turning said threaded portion in the threaded aperture of the base.

3. A thermostat cartridge comprising an outer cup-shaped casing having a flange at its open end, a cup-shaped bellows having a flange seated on the flange of the casing, and means clamping said flanges together in sealing relation, said clamping means comprising an externally threaded closure member having a seat at the end thereof adapted to seat upon the flange of the bellows, an internally threaded collar having an aperture closely fitting the exterior of the casing, said collar also having an internal annular seating shoulder which forms a seat for the flange of the casing, said clamping means also having an internally threaded portion for mounting the cartridge, the closure member having an axial aperture, and a plunger connected to the inner end of said bellows and having a sliding fit in said aperture.

4. A thermostat cartridge comprising an outer cup-shaped casing having a flaring flange at its open end, a cup-shaped bellows having a flaring flange adapted to seat on the flange of the casing, means for sealing the open end of the casing comprising an externally threaded closure member having a tapered seat at the end thereof adapted to fit within the flaring flange of the bellows and a collar having a cylindrical portion which has a close fit upon the exterior of the casing, an internal conical seat which forms a seat for the flange of the casing and an internally threaded portion adapted to be screwed upon the closure member, said closure member having an axial aperture and a plunger connected to the inner end of said bellows and having a sliding fit in said aperture.

5. In mechanism of the character described, the combination with a supporting base and a control mechanism carried thereby, of a thermostat cartridge for operating said control mechanism, said cartridge comprising a relatively inextensible outer cup-shaped member, a relatively extensible inner bellows member disposed entirely within said outer member, a common closure member sealing the open ends of said inner and outer members and providing a fluid-tight thermostat liquid receiving chamber therebetween, and an actuating plunger positioned within said inner member and extending through and beyond said closure member, said closure member being threadably engaged by said supporting base whereby said plunger may engage said control mechanism and whereby said cartridge may be bodily moved relative to said supporting base to adjustably control the operating temperature of said cartridge.

In testimony whereof I affix my signature.

CHARLES B. SAWYER.